Oct. 16, 1962  J. P. McCALLISTER  3,059,183
TRANSISTOR TEST CIRCUIT
Filed April 2, 1959

INVENTOR.
JAMES P. McCALLISTER
BY
Nelson E. Kimmelman
ATTORNEY

United States Patent Office 3,059,183
Patented Oct. 16, 1962

3,059,183
TRANSISTOR TEST CIRCUIT
James P. McCallister, East Plymouth Valley, Pa., assignor, by mesne assignments, to Philco Corporation, Philadelphia, Pa., a corporation of Delaware
Filed Apr. 2, 1959, Ser. No. 803,725
19 Claims. (Cl. 324—158)

This invention relates to electrical testing systems and in particular to apparatus for measuring characteristics of semiconductive devices.

In the technology of semiconductive devices such as transistors it often is necessary to ascertain the characteristics of the transsistors used. Knowledge of such characteristics is of particular value in determining the suitability of a transistor for a given application. A graphic presentation of a characteristic as a function of an operating parameter such as output current is highly useful, for example, when two transistors are to be matched to one another for push-pull output stages, in the design of D.C. amplifiers, or in cases where the transistor's parameters are to complement the characteristics of other circuits or devices.

One of the most important parameters is the so-called forward current transfer ratio (formerly designated "beta") which is now usually symbolized by the notation $h_f$ (small-signal operation) or $h_F$ (large-signal or "static" operation). Another subscript letter is usually added to indicate the common electrode of the input and output circuits of the transistor. This ratio ($h_f$ or $h_F$) is generally defined, in the case of a transistor connected in the common-emitter configuration, for example, as the ratio of the collector current to the base current for a constant predetermined collector voltage. In particular, the present invention is concerned with the "static" parameter referred to above wherein the input signal has a relatively large range of amplitude variation, although it may be adapted for measuring the parameters of a device when the range of variation in the amplitude of the input signal is relatively small.

Previously, when it was desired to measure the large-signal forward current transfer ratio ($h_F$), a reading of (1) the current in the collector-emitter circuit for a given collector voltage and of (2) the current in the base-emitter circuit were made; the current was applied to the base, in a common-emitter configuration, and increased until the given collector current at which the ratio was to be ascertained was reached. When this occurred, the value of the base current was divided into the value of the collector current. This method is inherently susceptible to numerous possibilities for error and requires a number of adjustments and calculations. Furthermore, this method is time-consuming and inadequate when it is desired to know not just the transfer ratio for a single value of collector current, but the transfer ratio at a number of selected collector currents. Consequently a system which would measure and indicate instantaneously the transfer ratios of a given transistor throughout a range of collector currents would expedite comparisons of transistors for matching purposes in production, for example.

Accordingly, it is an object of my invention to provide a novel system for measuring the parameters of semiconductive devices.

Another object of my invention is to provide a novel system for measuring the current transfer ratio of transistors.

Still another object of this invention is to provide a novel and expeditious way for measuring and/or indicating simultaneously the current transfer ratio of transistors at a number of different values of output current.

Yet another object of my invention is to provide a novel system for measuring and/or indicating the forward current transfer ratio of transistors in the common-emitter configuration.

Still other objects of my invention will be appreciated from an inspection of the drawings, specification and claims herein.

My invention is based upon the fact that when transistors having three elements are connected in a circuit of common-emitter or common-collector configuration, current through the input circuit flows in a direction opposite the current flow in the output circuit. Generally this kind of transistor has one element common to both the input and output current loops when used in the common-emitter or collector mode. Accordingly if certain values of resistance are put in each loop, it is possible to produce a condition wherein the voltage across the resistance in one loop will be equal and opposite to the voltage in the other loop. If the value of each resistance is known, it will be shown below that the current transfer ratio may be immediately and directly ascertained when this null condition is produced.

In a preferred form of the invention, a fixed resistor of appropriate ohmic value is placed in series with the output circuit of the transistor under test with one terminal connected to the common electrode, and a potentiometer is placed in series with the input circuit with one terminal connected to the common electrode. A varying amplitude signal is then applied to the input circuit. The tap on the potentiometer is then adjusted until the voltage across the series combination of the output-circuit resistor and the tap-to-common-electrode portion of the potentiometer is zero, whereupon the value of the forward current transfer ratio may be directly read from the setting of the potentiometer. According to another aspect of the invention a novel system for visually indicating the current transfer ratio for several values of collector current by means of an oscilloscope presentation is provided as will be explained hereinafter.

Figure 1:
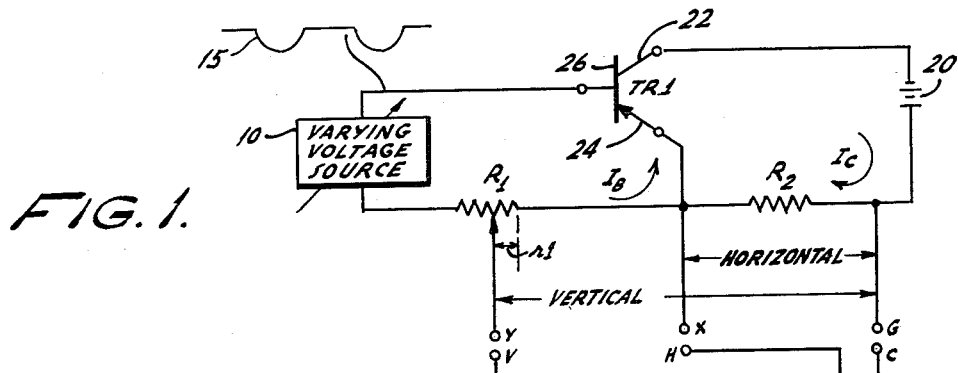
FIGURE 1 is a schematic diagram of the basic circuit of my invention.

Referring to FIG. 1, the invention will be explained with reference to ascertaining the large-signal transfer ratio ($h_{FE}$) of a transistor connected in the common-emitter configuration, although the concept is equally applicable to measurement of large or small current transfer ratio in the common-collector mode of operation. A PNP transistor TR1 which is to be tested is shown having its base connected to an input source 10 of a cyclically varying voltage of adjustable amplitude, the other terminal of which is connected to a resistance $R_1$, preferably a potentiometer. The other terminal of potentiometer $R_1$ is connected to the emitter 24. The source 10 may be, for example, a conventional transistor emitter-follower circuit driven by a 60 cycle A.C. input to its base and common electrode and biased so that its output consists of the rectified half cycles of wave 15 as shown. Source 10 is provided with a suitable voltage-amplitude control so that the transistor TR1 may be driven to develop the range of collector currents of interest. The wave 15 causes the base 26 of TR1 to become first increasingly, and then decreasingly, negative on alternate half cycles. This causes a corresponding increase and decrease in the current in the output circuit which consists of a fixed voltage source 20 such as a battery connected to the collector 22 and to one terminal of resistance $R_2$ whose other terminal is connected to the common-emitter 24. Further reference will be made hereinafter to selection of a specific value for $R_2$, but in general $R_2$ should be so selected that, in the range of collector currents desired, the voltage developed across $R_2$ remains small (e.g. 10%) compared to the voltage of source 20.

With the connections described, the collector-emitter output circuit current ($I_C$) flow of TR1 is clockwise whereas the base-emitter input circuit current flow ($I_B$) is counter-clockwise. Hence if $R_2$ is maintained constant, a voltage null will be produced between terminals G and Y when the slider of potentiometer $R_1$ is moved to a particular point thereon. In the following analysis, resistance $r_1$ is taken as that part of the resistance $R_1$ which is included between the slider terminal Y and emitter terminal X.

The relation of the voltages and resistances in the input and output circuits may be understood from the following: When $$r_1 I_B = R_2 I_C \quad (1)$$

the voltage between terminals G and Y will be equal to zero, ie., $$E_{GY} = r_1 I_B - R_2 I_C = 0 \quad (2)$$

Expression 1 may be rewritten as $$\frac{I_C}{I_B} = \frac{r_1}{R_2} = h_{FE_0} \quad (3)$$

where $h_{FE_0}$ is the $h_{FE}$ for 0 volts output between G and Y. It is thus seen that if $R_2$ is a constant, $h_{FE_0}$ is a direct, linear function of the value of $r_1$. Consequently, if $R_2$ is made equal to some integral power of 10 (e.g. 0.1 ohm, 1.0 ohm, or 10 ohms), the forward current transfer ratio is seen to be easily readable in terms of the value of $r_1$.

To illustrate, let us suppose it is desired to ascertain $h_{FE}$ at a collector current of 1 ampere. If $R_2$ equals 1 ohm, 1 volt will be developed across it. Assuming that, to produce a null between G and Y (i.e. across the series combination of $r_1$ and $R_2$), the potentiometer $R_1$ must be set so that $r_1 = 100$ ohms, the current traversing $r_1$ must be .01 ampere since $r_1 \times 100$ must equal 1 volt to balance the 1 volt developed across $R_2$. This is presented below with these values substituted in Equation 2.

$$E_{GY} = 100 \times .01 - 1 \times 1 = 1 - 1 = 0 \quad (4)$$

Also, from Equation 3, $$h_{FE} = \frac{r_1}{R_2} = \frac{100}{1} = 100$$

It is thus seen that if $R_2$ is 1 ohm, and if (for $E_{GY} = 0$) the potentiometer $R_1$ is adjusted so that $r_1$ equals 100 ohms, the forward current transfer ratio is 100 and may be read directly from $r_1$.

The detection of the null across $R_1$ and $R_2$ in series may, alternatively, be accomplished by comparing the voltage between the terminals X and G with the voltage between the terminals X and Y, or may be detected by other conventional bucking or null-indicating devices (including audible null detectors).

Display for Numerous Values of $I_C$

The present invention also provides a novel and superior way not only of indicating the current transfer ratio for a single value of collector current, but also for indicating the current transfer ratio characteristics of the transistor under test for a number of values of collector current. To accomplish this, the vertical deflection input of an oscilloscope 40 is coupled to the terminals G and Y, and the horizontal input thereof is coupled to the terminals G and X. Over the screen of the oscilloscope 20 a transparent mask 30 is placed which consists of a number of straight lines originating from a common point of origin O as may be seen in enlarged view in FIG. 2. Each of these lines represents a different value of current transfer ratio, the horizontal line 35 representing a value $$h_{FE} = h_{FE_0} = \frac{r_1}{R_2}$$

(see Equation 3), i.e. that value of $h_{FE}$ for which the algebraic sum of the voltage across $r_1$ and $R_2$ is zero. If this value of $h_{FE_0}$ is taken as the nominal or 100% value, then the lines above the horizontal line may represent higher percentage values and those below represent lower percentage values of $h_{FE}$. With this set-up, when the input circuit (base-emitter) current varies in accordance with the negative pulsating D.C. input wave 15 from the source 10, the collector current in the output (emitter-collector) circuit for each pulse will vary accordingly as a function of the $h_{FE}$ of the transistor, and will be manifest on the screen as a trace 50, for example. Since the parameter $h_{FE}$ is in general not a fixed constant, but varies with $I_C$, the trace 50 will not be a straight line. The horizontal axis of the screen may be calibrated in units of collector current because the horizontal sweep of the oscilloscope is driven by the voltage developed solely across $R_2$ and is therefore directly representative of collector current. By examination of the trace 50 with respect to its location in the sectors defined by the lines on the screen 30 representative of the different current transfer ratios, an observer can immediately ascertain the transfer ratio characteristics of the transistor under test. Hence if two transistors are to be matched, a visual comparison of the traces produced by both of them may be made. If the traces indicate substantial and proximate parallelism therebetween at most points of the desired collector current operating range, the transistors may be said to be matched.

Derivation of the Mask 30

The mask 30 is obtained by computing various other values of $h_{FE}$ having values which are chosen percentages of reference $h_{FE_0}$. To obtain the lines representing values of $h_{FE}$ which are higher or lower percentages of $h_{FE_0}$ Equation 2 is rewritten as follows:

$$E_{GY} = I_C R_2 - r_1 I_B \quad (5)$$

By definition $$h_{FE} = \frac{I_C}{I_B}, \text{ and } I_B = \frac{I_C}{h_{FE}} \quad (6)$$

Furthermore, from Equation 3, it is evident that $$r_1 = h_{FE_0} R_2 \quad (7)$$

Consequently, Equations 6 and 7 are substituted in Equation 5 thusly:

$$E_{GY} = I_C R_2 - h_{FE_0} R_2 \frac{I_C}{h_{FE}} \quad (8)$$

$$= I_C R_2 \left(1 - \frac{h_{FE_0}}{h_{FE}}\right) \quad (9)$$

$$= I_C R_2 \left(\frac{h_{FE} - h_{FE_0}}{h_{FE}}\right) \quad (10)$$

Thus, for example, to obtain data to plot the line 45 (FIG. 2b) which represents $h_{FE} = 90\% h_{FE_0}$, the desired value, $.9 h_{FE_0}$ is substituted for $h_{FE}$ in (10) as follows:

$$E_{GY} = I_C R_2 \left(\frac{.9 h_{FE_0} - h_{FE_0}}{.9 h_{FE_0}}\right) \quad (11)$$

$$= I_C R_2 \left(\frac{-.1}{.9}\right) \quad (12)$$

$$= I_C R_2 (-.11) \quad (13)$$

Figure 2:
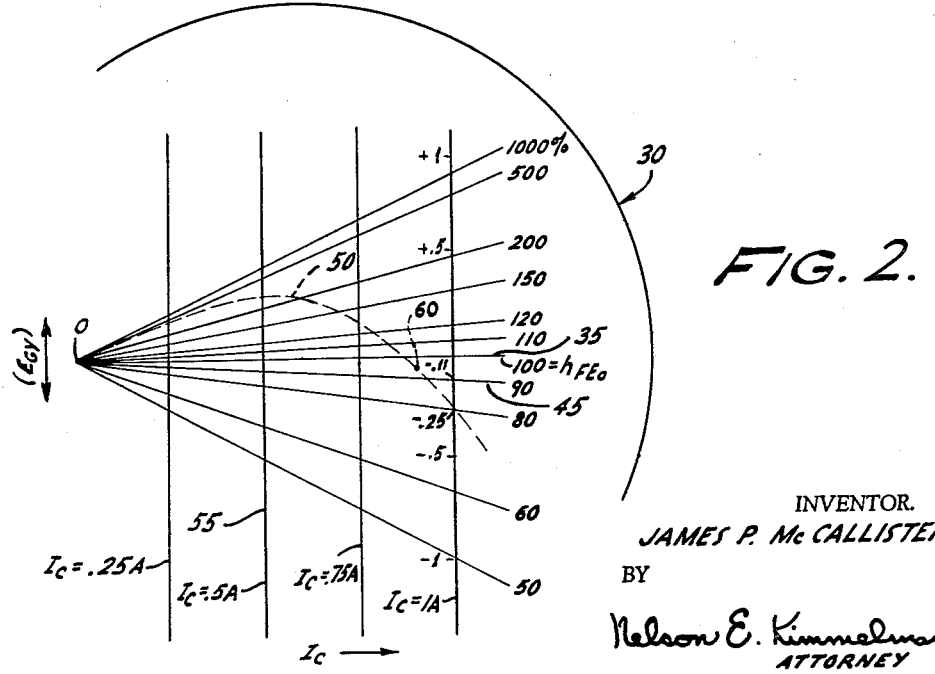
FIGURE 2 is a close-up of the calibrated screen of the oscilloscope shown in the overall system of FIG. 1.

If $I_C$ equals 1 amp. and $R_2$ equals 1 ohm then $E_{GY}$ will equal $-.11$. This value may then be plotted on the $I_C = 1$ a. line in a vertical direction and according to any desired scale. In FIG. 2 the ratio of the horizontal scale to the vertical scale is 2:1 so that −.11 on the $I_C=1$ a. line will be located as shown therein. Then the 90% line 45 is drawn from 0 through −.11 on the 1 a. line. Of course, other ratios than 2:1 can be chosen, i.e., 2:4 in which case the lines would be further apart so that more accurate readings are possible in the zones near $h_{FE_0}$ where the lines are generally closer to one another.

To obtain the other lines, the desired value of $h_{FE}$ is similarly inserted in Equation 10. Thus it may be shown that the 80% line, for example, intersects the $I_C=1$ a. line at −.25, the 110% line intersects it at +.09 and so forth. As in the previous case, lines are then drawn from origin 0 to −.25 and +.09 respectively.

Calibration of Oscilloscope

Figure 3:
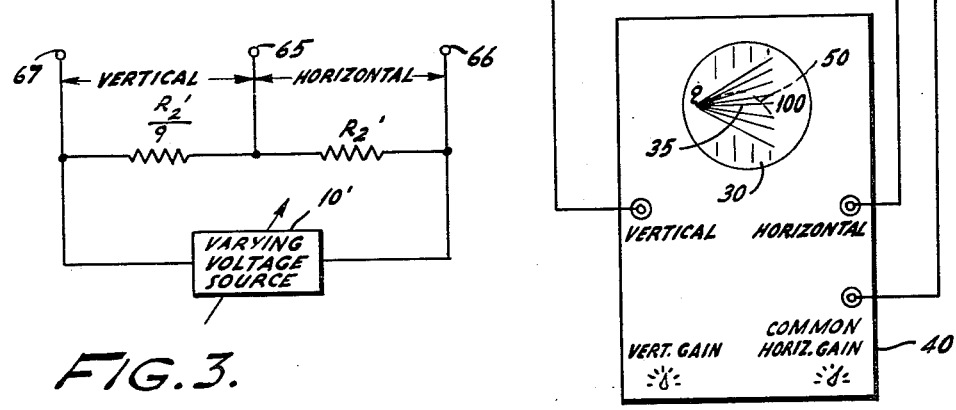
FIGURE 3 is a schematic diagram of a circuit useful in calibrating the oscilloscope shown in FIG. 1 for simultaneous presentation of different values of the current transfer ratio at different output currents.

Having obtained the mask 30, the next step is to correlate the oscilloscope presentation with it. This is accomplished by substituting in place of the test circuit portion of FIG. 1 the calibration circuit shown in FIG. 3 as the input to the oscilloscope 40. The purpose of the circuit of FIG. 3 is to produce a voltage which causes the oscilloscope 40 to produce a straight line trace which can be aligned with a selected line of the mask 30, e.g., with the line 45 representing a value of $h_{FE}=.90h_{FE_0}$. A source 10′ of a pulsating D.C., which may be substantially the same as source 10 of FIG. 1, is connected in series with a resistor $$\frac{R_2'}{9}$$

and a resistor $R_2'$.

The value of the resistor $$\frac{R_2'}{9}$$

in series with $R_2'$ is, as shown, chosen to be one-ninth that of $R_2'$ so that the voltage drop across the former is one-ninth that across the latter. As has been seen previously, when $h_{FE}=.9h_{FE_0}$ and $E_{GX}=1$ volt, $E_{GY}=.11$, i.e., about one-ninth (1/9) of the value of $E_{GX}$. Since the same current traverses both resistors in the calibration circuit of FIG. 3, the value of the resistance between terminals 65 and 67 must be 1/9 of the value of the one between 65 and 66.

The horizontal gain control of the oscilloscope 40 is first adjusted to provide the desired calibration for the horizontal $I_C$ scale of the mask 30. This is done by adjusting the voltage from the source 10′ until the peak-to-peak voltage across $R_2'$ is such that a peak current equivalent to $I_C=1$ a. is reached. Terminals H and C are connected to terminals 65 and 66 respectively across resistor $R_2'$, which is intended to correspond to the resistance $R_2$ of FIG. 1. The desired voltage to be supplied by the source 10′ can be determined by $$E=\frac{10}{9}R_2'\times 1 \text{ a}$$

Then the horizontal gain control of the oscilloscope 40 is adjusted until the horizontal sweep reaches the $I_C=1$ a. line. The relationship between the calibration circuit and the horizontal calibration of the oscilloscope may also be stated as follows:

$$\frac{\text{horiz. scale amperes}}{\text{scale division}}\times R_2=\frac{\text{oscilloscope horiz. volts}}{\text{scale division}}$$

Then terminal V is connected to terminal 67. When connected thusly, a straight line trace will be produced which, by manipulation of the vertical deflection gain control of the oscilloscope 40, can be made to coincide with the line 45 of the mask 30 (FIG. 2) at which time the calibration process is complete. Once the oscilloscope 40 has been calibrated, the calibration circuit is disconnected from the oscilloscope and the test circuit of FIG. 1 is substituted therefor.

Interpretation of Oscilloscope Presentation

If a transistor TR1 is placed in the circuit of FIG. 1, the oscilloscope 40 will produce, for example, a trace 50 (FIGS. 1 and 2) which represents a plot of $E_{GY}$ as a function of $I_C$. A number of things are made manifest by this trace. The trace 50 indicates the value of the current transfer ratio at any and all values of collector current ($I_C$, horizontal component) in the circuit of FIG. 1. When the trace 50 intersects any one of the lines on the mask it indicates the $h_{FE}$ value exactly. Since, at the point where the trace 50 crosses the 100% line 35, $E_{GY}=0$, the current transfer ratio for a collector current of about .87 a. is 100% of $h_{FE_0}$. Similarly where the trace 50 intersects the 200, 150 and 120 lines the, current ratio is 200%, 150% and 120% of $h_{FE_0}$ for collector currents of .62 a., .7 a., and .78 a. respectively. If $h_{FE_0}$ happens to be 100, then of course the readings at .62 a., .7 a. and .78 a. are not only in percentages but are also absolute quantities, i.e., 200, 150, and 120 respectively. At other points on the trace, where it does not intersect any lines, its $h_{FE}$ values for various levels of $I_C$ may be obtained by interpolation. For example, at point 60 the value of $h_{FE}$ is about 95% of $h_{FE_0}$ for a collector current of about .91 a. Thus, at every point the trace 50 indicates the value of $h_{FE}$ of the transistor under test as a percentage of $h_{FE_0}$.

In practice, $r_1$ can be set for any value of $h_{FE_0}$, so that if the setting is actually 45, then at the point where the trace crosses the 110% line $h_{FE}=110\%$ of 45 or 49.5. Also, if the potentiometer is adjusted to move the trace so that it intersects the 100% line at a selected $I_C$, the value of $h_{FE}$ at that value of $I_C$ may be read directly from the potentiometer setting.

It is then evident that it is relatively simple to match two or more transistors by comparison of their respective traces produced on the oscilloscope 40 when they are plugged into the test circuit of FIG. 1. If most points on the traces of both transistors in the desired range of currents fell, for example, in the sector between the 110% and 120% lines, it is clear that the two transistors are matched rather well. Even closer matching can be accomplished by detailed comparison of the two curves.

While the invention has been explained in terms of a circuit in which the calibrated variable resistance $R_1$ is located in the input circuit, it is equally possible to make the resistance in the input circuit constant and the resistance in the output circuit variable. In his case, however, the calibration of the variable resistance will not be linear.

It should be observed that $R_1$ need not be a potentiometer; a resistance substitution device may alternatively be used, but then the base current would change correspondingly. Hence, a potentiometer is considered to be preferable.

The resistance elements may also be placed elsewhere in their respective loops. $R_1$ could be inserted, for example, between the base and the source 10, and $R_2$ could be placed between the collector 22 and battery 20, or just one of them could be connected differently. So long as each resistance is traversed by substantially all of the current in the loop in which it is located, the exact placement is immaterial because it is the mutual relation of the respective voltages across the resistances which is utilized.

The invention has also been explained in terms of a PNP transistor, but it should be stressed that it is equally applicable to an NPN type of transistor provided the polarity of the bias and input voltages are reversed. As stated before, either the common-emitter or common-collector configuration may be employed.

It has been previously mentioned that one of the preferred methods of providing the variable pulsating D.C. input signal is by using a transistor emitter-follower driven by an A.C. signal on its base and biased so that its output consists of the desired half sine-wave. Conceivably, the input to the transistor TR1 from the variable voltage source may, if the transistor under test is properly biased, consist of an A.C. wave, the biasing on the transistor causing effective rectification. Of course, the variable D.C. source 10 may alternatively consist of an A.C. voltage source whose output is rectified by a series diode.

The function of the source 10 is to supply a wave which will vary the current in the input circuit so as to "sweep" the output circuit through a desired range of collector currents for presentation on the oscilloscope 40. As such, the nature of the signal applied to the input of the transistor under test may alternatively consist of a sawtooth or other complex wave rather than the semisinusoidal wave 15 as explained hereinabove.

While the invention has been explained in terms of a large-signal input, it is also adaptable for use with small-signal inputs to obtain the $h_f$ parameters. This may be accomplished by altering the circuit of FIG. 1, for example, in the following way: A blocking capacitor is placed in series with each of the resistive elements to form two RC circuits and an inductance is placed in parallel with each of the RC circuits. Accordingly, only the A.C. component of the input signal will flow through the RC circuit path and produce changes in voltage corresponding thereto, whereas the D.C. component will flow through the choke and will not cause changes in current.

I claim:

1. A circuit for indicating a selected parameter of a transistor-like device having electrodes corresponding substantially to a base electrode, an emitter electrode and a collector electrode, said test circuit comprising a first impedance and a second impedance, one of said impedances having a reference ohmic value and the other having a variable ohmic value, one end terminal of said first impedance being joined to one end terminal of said second impedance, means for coupling said first terminals to one of said three electrodes other than said collector electrode, a first signal source coupled between a second terminal of said first impedance and a point in said circuit which may be conductively connected to one of the two remaining electrodes of said device to be tested, a second signal source coupled between a second terminal of said second impedance and a point in said circuit which may be conductively connected to the third electrode of said device to be tested, said signal source connected to said collector electrode being a source of bias potential and the other of said signal sources being a source which provides an output signal having a time varying output voltage wave, a cathode-ray indicator having first deflection means thereof coupled between selected points on said first and second impedances which are remote from said first terminals, said deflection means being adapted to deflect the beam of said cathode-ray indicator in accordance with the difference between the magnitude of the signal developed between said selected point and said first point on said first impedance and the magnitude of the signal developed between said selected point and said first point on said second impedance, said cathode-ray indicator being further provided with second deflection means coupled across a fixed portion of said impedance in said collector electrode circuit whereby said difference in magnitude of said signal is displayed as a function of the magnitude of the current in said collector electrode.

2. The testing circuit according to claim 1 wherein said cathode ray means includes means associated therewith for visually indicating selected values of current transfer ratios.

3. A circuit for indicating a selected parameter of a transistor-like device having electrodes corresponding substantially to a base electrode, an emitter electrode and a collector electrode, said test circuit comprising a potentiometer having first and second end terminals and a movable tap, a reference resistor having a first end terminal thereof coupled to said first terminal of said potentiometer, means for coupling said joined first terminals of said potentiometer and said reference resistor to one of said three named electrodes of the device to be tested other than said collector electrode, a first signal source coupled between said second terminal of said potentiometer and a point in said circuit which may be conductively connected to one of the two remaining electrodes of said device to be tested, a second signal source coupled between said second terminal of said reference resistor and a point in said circuit which may be conductively connected to the third electrode of said device to be tested, said signal source associated with said collector electrode being a source of bias potential and the other of said signal sources providing an output signal having a time varying output voltage wave, indicator means coupled to said tap on said potentiometer and to said second terminal of said reference resistor, said indicator means being adapted to provide an indication of the difference between the magnitude of the signal developed between said movable tap and said first terminal of said potentiometer and the magnitude of the signal developed across said reference resistor, and means associated with said potentiometer for providing an indication representative of the resistance between said movable tap and said first terminal.

4. A test circuit in accordance with claim 3 wherein said indicator means is additionally coupled to said joined first terminals of said potentiometer and said reference resistor and wherein said indicator means is adapted to indicate said difference in magnitude of said developed signals as a function of the current flow in said collector electrode.

5. A test circuit in accordance with claim 4 wherein said indicator means includes a cathode-ray indicator, and wherein the beam of said cathode-ray indicator is deflected in one orthogonal direction in accordance with said difference in signal magnitude and in a second orthogonal direction as a function of the signal voltage developed across said reference resistor.

6. A testing circuit in accordance with claim 5 wherein said cathode-ray indicator includes means associated therewith for visually indicating selected values of current transfer ratios.

7. A testing circuit according to claim 6 wherein said associated means includes reference lines of selected fixed values of current transfer ratios emanating from a common point and additional marking for graphically indicating reference values of the current in said collector electrode circuit.

8. A test circuit for indicating a selected parameter of a transistor-like device having electrodes corresponding substantially to a base electrode, an emitter electrode and a collector electrode, said test circuit comprising a potentiometer having first and second end terminals and a movable tap, a reference resistor having a first end terminal thereof coupled to said first terminal of said potentiometer, means for coupling said joined first terminals of said potentiometer and said reference resistor to said emitter electrode, a first signal source coupled between said second terminal of said potentiometer and a point in said circuit which may be conductively connected to one of the two remaining electrodes of said device to be tested, a second signal source coupled between said second terminal of said reference resistance and a point in said circuit which may be conductively connected to the third electrode of said device to be tested, said signal sources associated with said collector electrode being a source of bias potential and the other of said signal sources providing an output signal having a time varying output voltage wave, signal amplitude indicator means coupled to said tap on said potentiometer and to said second terminal of said reference resistor, and means associated with said potentiometer for providing an indication which is representative of the resistance between said movable tap and said first terminal.

9. A test circuit in accordance with claim 8 wherein said indicator means is additionally coupled to said joined first terminals of said potentiometer and said reference resistor and wherein said indicator means is adapted to indicate the amplitude of the signal measured between said movable tap and said second terminal of said reference resistor as a function of the current flowing in said collector electrode.

10. A test circuit in accordance with claim 9 wherein said indicator means includes a cathode-ray indicator, and wherein the beam of said cathode-ray indicator is deflected in one orthogonal direction in accordance with the amplitude of said signal measured between said movable tap and said second terminal of said reference resistor and in a second orthogonal direction as a function of the signal voltage developed across said reference resistor.

11. A testing circuit in accordance with claim 10 wherein said cathode-ray indicator includes means associated therewith for visually indicating selected values of current transfer ratios.

12. A testing circuit according to claim 11 wherein said associated means includes reference lines of selected fixed values of current transfer ratios emanating from a common point and additional marking for graphically indicating reference values of the current in said collector electrode circuit.

13. A test circuit for indicating a selected parameter of a transistor-like device having electrodes corresponding substantially to a base electrode, an emitter electrode and a collector electrode, said test circuit comprising a potentiometer having first and second end terminals and a movable tap, a reference resistor having a first end terminal thereof coupled to said first terminal of said potentiometer, a signal source having a time varying output voltage wave, said signal source being coupled between said second terminal of said potentiometer and a point in said test circuit which may be conductively connected to said base electrode of said device to be tested, a source of bias potential having one terminal connected to the second end terminal of said reference resistor and the other terminal thereof connected to a point in said test circuit which may be conductively connected to said collector electrode of the device to be tested, means for coupling said joined first terminals of said potentiometer and said reference resistor to said emitter electrode of the device to be tested, signal amplitude indicator means coupled between said tap on said potentiometer and said second end terminal of said reference resistor, and means associated with said potentiometer for providing an indication which is representative of the resistance between said movable tap and said first terminal.

14. A test circuit in accordance with claim 13 wherein said indicator means is additionally coupled to said joined first terminals of said potentiometer and said reference resistor and wherein said indicator means is adapted to indicate the amplitude of the signal measured between said movable tap and said second terminal of said reference resistor as a function of the current flowing in said collector electrode.

15. A test circuit in accordance with claim 14 wherein said indicator means includes a cathode-ray indicator, and wherein the beam of said cathode-ray indicator is deflected in one orthogonal direction in accordance with the amplitude of said signal measured between said movable tap and said second terminal of said reference resistor and in a second orthogonal direction as a function of the signal voltage developed across said reference resistor.

16. A testing circuit in accordance with claim 15 wherein said cathode-ray indicator includes means associated therewith for visually indicating selected values of current transfer ratios.

17. A testing circuit according to claim 16 wherein said associated means includes reference lines of selected fixed values of current transfer ratios emanating from a common point and additional marking for graphically indicating reference values of the current in said collector electrode circuit.

18. A test circuit for indicating the current transfer ratio of a transistor having a base electrode, an emitter electrode, and a collector electrode, said test circuit comprising a potentiometer having first and second end terminals and a movable tap, a reference resistor having a first end terminal thereof conductively connected to said first terminal of said potentiometer, a signal source having a time varying output voltage wave, said signal source being conductively connected to said second terminal of said potentiometer and to a point in said test circuit which may be conductively connected to said base electrode of said transistor, a source of bias potential having one terminal conductively connected to the second end terminal of said reference resistor and the other terminal thereof conductively connected to a point in said test circuit which may be conductively connected to said collector electrode of the transistor to be tested, means for conductively connecting said joined first terminals of said potentiometer and said reference resistor to said emitter electrode of the transistor to be tested, cathode-ray tube indicator means having first beam deflection means coupled between said tap on said potentiometer and said second end terminal of said reference resistor and second beam deflection means coupled across said reference resistor, the screen of said cathode-ray indicator being provided with reference lines of selected fixed values of current transfer ratios, said lines emanating from a common point, said screen being further provided with reference lines graphically indicating reference values of current in said collector circuit, and means associated with said potentiometer for providing an indication which is representative of the resistance between said movable tap and said first terminal.

19. A circuit for indicating a selected parameter of a transistor-like device having electrodes corresponding substantially to a base electrode, an emitter electrode and a collector electrode, said test circuit comprising a first impedance and a second impedance, one of said impedances having a reference ohmic value and the other having a variable ohmic value, one end terminal of said first impedance being joined to one end terminal of said second impedance, means for coupling said first terminals to one of said three electrodes other than said collector electrode, a first signal source coupled between a second terminal of said first impedance and a point in said circuit which may be conductively connected to one of the two remaining electrodes of said device to be tested, a second signal source coupled between a second terminal of said second impedance and a point in said circuit which may be conductively connected to the third electrode of said device to be tested, said signal source connected to said collector electrode being a source of bias potential and the other of said signal sources being a source which provides an output signal having a time varying output voltage wave, a cathode-ray indicator having first deflection means thereof coupled between selected points on said first and second impedances which are remote from said first terminals, said deflection means being adapted to deflect the beam of said cathode-ray indicator in accordance with the difference between the magnitude of the signal developed between said selected point and said first point on said first impedance and the magnitude of the signal developed between said selected point and said first point on said second impedance, said cathode-ray indicator being further provided with second deflection means coupled across a fixed portion of said impedance in said collector electrode circuit whereby said difference in magnitude of said signal is displayed as a function of the magnitude of the current in said collector electrode circuit, said cathode-ray indicator including means associated with the screen thereof for visually indicating selected values of current transfer ratios, said associated means including reference lines of selected fixed values of current transfer ratios emanating from a common point, said associated means further including means for graphically indicating reference values of the current flowing through said impedance in said collector electrode circuit.

References Cited in the file of this patent

UNITED STATES PATENTS 2,897,448     Raisbeck _____ July 28, 1959

OTHER REFERENCES

Bohr: "Radio Electronics," pages 30–32, August 1954.

"Proceedings of the I.R.E.," pages 1551–1552, November 1956.

Todd: "Radio and Television News," pages 54–55, March 1957.